Feb. 20, 1968 L. MATTEUCCI 3,370,146
ELECTROEROSIVE BURR-REMOVING METHOD AND APPARATUS
Filed March 9, 1964

INVENTOR.
LUIGI MATTEUCCI
BY Whittemore,
Hulbut & Belknap
ATTORNEYS

United States Patent Office 3,370,146
Patented Feb. 20, 1968

3,370,146
ELECTROEROSIVE BURR-REMOVING METHOD
AND APPARATUS
Luigi Matteucci, Porretta Terma, Provincia de Bologna, Italy, assignor to S.p.A. Officine Meccaniche Fratelli Daldi & Matteucci, Milan, Italy, a company of Italy
Continuation-in-part of application Ser. No. 225,227, Sept. 21, 1962. This application Mar. 9, 1964, Ser. No. 350,154
Claims priority, application Italy, June 19, 1962, 24,610, Patent 671,375
8 Claims. (Cl. 219—68)

ABSTRACT OF THE DISCLOSURE

Apparatus for and a method of removing protruding irregularities, such as burrs, from engaging gear surfaces, including means for rotatably mounting a first gear, means for rotatably mounting a second gear in mesh with the first gear and electrically insulated therefrom, means for rotating one of said gears and an electric circuit including said gears in series for passing low voltage, high current electrical energy between the gears intermittently without a dielectric therebetween in combination with means for determining the noise produced on rotation of the gears and the method of use of such apparatus whereby protrusions, such as burrs and the like on the engaging surfaces of the gears are burnt off to provide gears which are quiet when rotated in mesh.

This application in a continuation-in-part of now abandoned copending application Ser. No. 225,227, filed Sept. 21, 1962.

In the manufacture of articles, such as gears, protruding irregularities such as burrs are sometimes accidentally formed in the gear surfaces. These protruding irregularities are objectionable in that they produce noise on rotation of mating gears in mesh. In addition, protruding irregularities in mating gear surfaces produce undesirable stress concentrations which could result in serious damage to the gears.

In the past it has been the practice to position gears as they are produced on noise level measuring apparatus on which the gears are rotated in mesh one with the other, or with a master gear, to measure the noise produced by the meshed gears in operation. The level of the noise in such tests is indicative of the protruding irregularities in the surfaces of the gear teeth in contact. After protruding irregularities have been found to exist by the noise measuring, minute inspection of the gear to locate the actual defect therein has been required in the past.

A separate inspection is then required to remove the discovered defect, after which a recheck of the noise level of operation of the gear is necessary to insure that all of the defects have been dicsovered and removed. This procedure is obviously time consuming and not in keeping with modern mass production techniques.

It is therefore one of the objects of the present invention to provide improved apparatus for removing protruding surface irregularities from gears or the like.

Another object is to provide an improved method of removing protruding surface irregularities from gears or the like.

Another object is to provide apparatus for simultaneously checking the noise level of gears rotated in mesh and removing protruding surface irregularities from the gears.

Another object is to provide a method for simultaneously checking the noise level of gears rotated in mesh and removing protruding surface irregularities from the gears.

Another object is to provide apparatus for removing protruding irregularities, such as burrs, from the teeth surfaces of gears rotated in mesh the one with the other, or with a master gear, including insulated spindle structure for rotating a first gear in mesh with a second gear, means for mounting the second gear in mesh with the first one and for rotating them, also means for intermittently passing an electric signal of low voltage and high current between the two gears in mesh.

Another object is to provide a method of removing protruding irregularities from a work gear comprising rotating a gear or a master gear having no irregularities in the surface and rotating a gear having protruding irregularities in the surface meshing with the other gear, measuring the noise level of the rotating meshed gears and intermittently passing an electric signal of low voltage and high current between the two gears until the noise level of the rotating meshed gears is reduced below a predetermined maximum value.

Another object is to provide apparatus for and a method of electrically removing irregularities from the surfaces of gears or the like which are simple, economical and efficient.

Other objects and features of the invention will become apparent as the description proceeds, especially when taken in conjunction with the accompanying drawings, illustrating a preferred embodiment of the invention, wherein.

Figure 1:
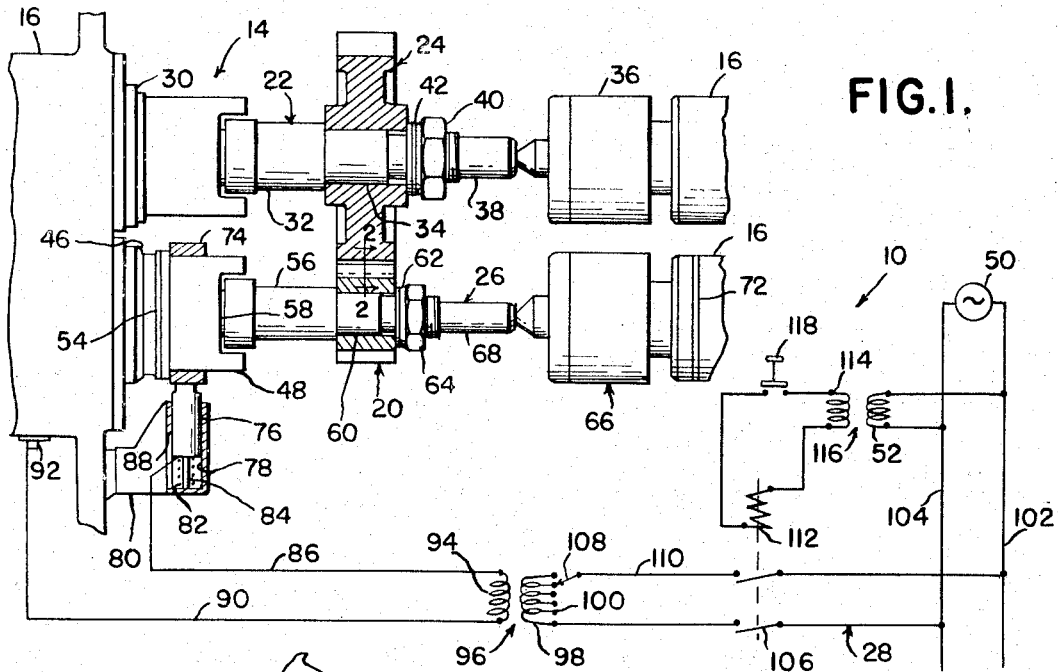
FIGURE 1 is a partly diagrammatic and partly schematic illustration of apparatus for electrically removing gear surface irregularities in accordance with the method of the invention.

With particular reference to the figures of the drawing, one embodiment of the present invention will now be considered in detail.

As shown best in FIGURE 1, the apparatus 10 for removing protruding irregularities, such as burr 12 from the surface of a work gear 20 comprises a portion of the apparatus 14 for measuring the noise level of gears rotated in mesh including structure 22 for rotatably mounting a gear 24 in mesh with gear 20 and insulated structure 26 for rotatably mounting the gear 20 in mesh with the gear 24. Apparatus 10 further includes the electric circuit 28 for applying an electric signal of low voltage and high current between gear 20 and gear 24.

In operation, as gear 20 and gear 24 are rotated in mesh on the noise level measuring instrument 14, the gears 20 and 24 will have a line contact as long as no protruding irregularities exist in the gear surfaces so that current passing therebetween will be spread over a relatively large area. Where a protruding irregularity, such as burr 12, appears on the surface of the gears, the current passing between the two gears will be concentrated in the irregularity due to the point contact between gears 20 and 24, so that the irregularity will be burned off.

The two gears are rotated in mesh until the protruding irregularities have been removed from the gears so that the noise level of the rotating pair of gears is below a predetermined maximum as measured by the apparatus 14.

The noise level measuring apparatus 14 is well known in the gear checking art and will therefore not be considered in detail herein except for the structures 22 and 26 which also form a part of the protruding irregularity removing apparatus 10.

More specifically the structure 22 for mounting the gear 24 for rotation comprises the rotatable spindle 30 supported for rotation in the frame 16 of the apparatus 14 and the shaft 32 secured in the spindle 30 for rotation therewith. Shaft 32 has the reduced diameter portion 34 on which the gear 24 is mounted as by convenient key means (not shown) for rotation with the shaft 32.

The nut 40 and pressure washer 42 are provided on shaft 32 for removably securing the gear 24 on the shaft 32.

The work holding member 36 for rotatably supporting the end 38 of the shaft 32 during rotation of the spindle 30 also supported in frame 16 of apparatus 14 completes the structure 22 for rotatably mounting the gear 24.

The structure 26 for mounting gear 20 in mesh with gear 24 includes the rotatable spindle 46, the end 48 of which is electrically insulated from the frame 16 of the noise testing apparatus 14 by the insulating pad 54. The end portion 48 of spindle 46 securely receives the shaft 56 whereby the shaft 56 is caused to rotate with the spindle 46. The shaft 56 is provided with the reduced diameter portion 60 on which the gear 20 is secured for rotation with the shaft 56 as by convenient key means (not shown) in conjunction with the clamping washer 62 and the nut 64.

The work holding member 66 is adapted to rotatably support the end 68 of the shaft 56. The work holding member 66 is in turn supported by the frame 16 of apparatus 14 and is insulated therefrom by the pad of insulating material 72. Thus it will be seen that except for the gear 20 in mesh with the gear 24, the shaft 56 and end 48 of spindle 46 are electrically insulated from the frame 16 of apparatus 14.

The circuit 28 for applying an electrical signal of low voltage and high current between the gear 20 and gear 24 in mesh includes the collector ring 74 secured to the end portion 48 of the spindle 46. The contact shoe 76 is resiliently biased in the chamber 78 formed in bracket 80 into contact with the collector ring 74 by the spring means 82. The shoe 76 is guided in its reciprocal movement on the rod 84 secured within the chamber 78.

The electrical conductor 86 is secured to the contact shoe 76 through an opening 88 in the bracket 80. The frame 16 of the noise testing apparatus 14 is connected to a second electrical conductor 90 by convenient means, such as bracket 92. Conductor 90 is therefore effectively electrically connected through the frame 16 of the noise testing apparatus 14 and the shaft 32 to the gear 24 while the conductor 86 is effectively electrically connected through the contact shoe 76, portion 48 of spindle 46 and shaft 56 to a gear 20 mounted on the shaft 56.

At the other ends the conductors 86 and 90 are secured to the opposite ends of the secondary winding 94 of transformer 96. Transformer 96 also includes the primary winding 98 having multiple taps 100. The primary winding 98 of transformer 96 through multiple tap 100 is capable of tapping different selected voltages from the conductors 102 and 104 which are connected to an alternating source 50 of low voltage and high current through the double pole, single throw switch 106.

The taps 100 and selector switch 108 in conductor 110 permit varying of the voltage in the secondary coil 94 of transformer 96 between, for example three and one-half and five volts. Transformer 96 is a step-down power transformer of, for example, seven hundred fifty watt capacity. Thus at between two and five volts between three hundred seventy-five and one hundred fifty amperes of current may flow in the conductors 86 and 90.

The transformer 96 is energized on closing of the switch 106. Switch 106 is closed on energizing the solenoid 112 by completing the circuit through the secondary winding 114 of transformer 116 by pressing the push-button switch 118. The primary winding 52 of transformer 116 is connected to the source of power 50 through the conductors 102 and 104. The circuit for energizing the switch 106 is provided as a safety measure. Thus the transformer 116 is a step-down transformer and the current passing through the switch 118 is only sufficient to actuate the switch 106.

In over-all operation it is desired to measure the noise level of a gear 20 rotated in mesh with a gear 24 and to simultaneously remove protruding irregularities, such as the burr 12, from the surfaces of the gear which are in contact with the surfaces of the gear 24. The gear 20 is therefore first mounted on the shaft 56 in mesh with the gear 24, as shown in FIGURE 1. The gears 20 and 24 are then rotated in mesh on rotation of the spindle 30 or spindle 46 or both.

During rotation of the gear 20 and the gear 24 considerable noise which may be measured by the noise measuring apparatus 14 is produced if protruding irregularities are present on gears.

Figure 2:
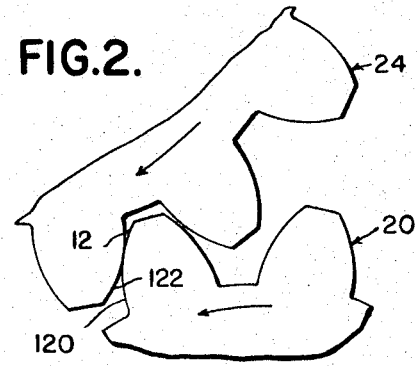
FIGURE 2 is an enlarged section view of a portion of the apparatus illustrated in FIGURE 1 taken substantially on the line 2—2 in FIGURE 1.
Figure 3:
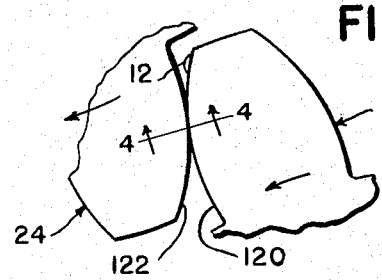
FIGURE 3 is a further enlarged section view of a portion of FIGURE 2 illustrating the gear teeth of FIGURE 2 in line contact.
Figure 4:
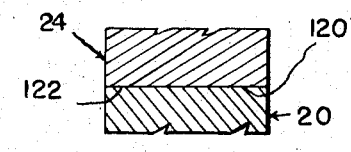
FIGURE 4 is a section view of the gear teeth illustrated in FIGURE 3 taken substantially on the line 4—4 in FIGURE 3.
Figure 5:
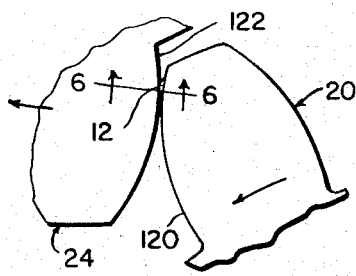
FIGURE 5 is a section view of the gear teeth illustrated in FIGURE 3 with the gears rotated slightly relative to each other from their position in FIGURE 3 to illustrate that point contact is provided between the gear teeth when a burr is present therebetween.
Figure 6:
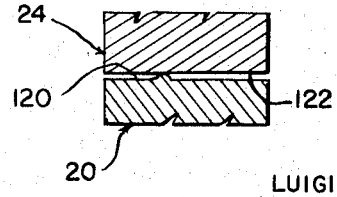
FIGURE 6 is a section view of the gear teeth illustrated in FIGURE 5 taken substantially on the line 6—6 in FIGURE 5.

The teeth of the gears during rotation of the gears in mesh are in moving line contact, as illustrated in FIGURE 2, when no protruding irregularities exist therebetween. However, when a burr is present on surface 120 of work gear 20, as illustrated in FIGURE 5, the line contact illustrated in FIGURES 3 and 4 is reduced to a point contact, as illustrated in FIGURES 5 and 6.

Thus on noting that the noise level of the gears in mesh is above a predetermined maximum an operator of the apparatus 10 presses the push-button 118 for a period of for example two to five seconds to close the switch 106 and energize the transformer 96 whereby a low voltage of for example two to five volts and a high current is passed between the gears during rotation thereof. The line contact provided by the gear teeth, as illustrated in FIGURES 3 and 4, provides a sufficient path for the high current to prevent overheating of the gear teeth at their moving line contact at the usual speed of the sound level measuring apparatus 14. However, when a point contact occurs as at burr 12, the concentration of current at a single point is so great that the burr is heated to the point that it is completely burned away.

The rotating speed of the gears 20 and 24 must be such that a super heating of the teeth surfaces is prevented along the moving line contact between the gears. The usual speeds of between five hundred and two thousand revolutions per minute at which sound level measuring apparatus 14 is operated are sufficient for this purpose.

The removal of the burr as it is best understood is a complete burning of the metal forming the burr and does not appear to be particularly effected by the pressure between the gears.

The signal applied between gear 20 and gear 24 has been indicated as being an alternating signal. It is understood that a unidirectional signal should work equally as well as an alternating signal.

The burr removing operation is intermittent. That is to say that on noting a noise level higher than a maximum desired level the operator presses the push-button 118 for three or four seconds during which the work gear may make a series of revolutions and complete a deburring operation. The noise level is then again checked and the deburring operation is repeated if necessary. Usually one, three or four second period is sufficient to remove burrs.

If noise is produced in the meshed gears by factors other than protruding irregularities on the gear teeth the completion of the deburring operation may be visually recognized by the disappearing of the characteristic sparking or arcing which may be observed between the teeth of the gears as soon as the push-button is operated.

While one embodiment of the present invention has been disclosed in detail other embodiments and modifications of the invention are contemplated. Thus the invention may be modified to permit removing of protruding irregularities from the contacting teeth of straight spur, helical spur, straight bevel and helical bevel gears as well as from teeth having an involute profile. It is the intention to include all such modifications and embodiments as are defined by the appended claims within the scope of the invention.

What I claim as my invention is:

1. Apparatus for removing protruding irregularities from the surfaces of a pair of gears to insure quiet operation thereof, comprising means for determining the noise produced by the gears rotating in mesh, means for rotating the gears in mesh on the means for determining the noise and means for intermittently passing an electric signal of low voltage and high current between the gears rotating in mesh on the means for determining the noise for periods of between two and five seconds to simultaneously remove protruding irregularities from the gears and reduce the noise produced by the gears rotating in mesh.

2. Structure as set forth in claim 1 wherein the voltage of the electric signal is between two and five volts.

3. Structure as set forth in claim 1 wherein the current of the electric signal is between one hundred fifty and three hundred seventy-five amperes.

4. Structure as set forth in claim 1 wherein the gears are rotated in mesh at between five hundred and two thousand revolutions per minute.

5. The method of removing protruding irregularities from the surface of a pair of gears to insure quiet operation thereof, comprising determining the noise produced by the gears rotating in mesh, rotating the gears in mesh on the means for determining the noise and intermittently passing an electric signal of low voltage and high current between the gears rotating in mesh for periods of between two and five seconds to simultaneously remove protruding irregularities from the gears and reduce the noise produced by the gears rotating in mesh.

6. The method as set forth in claim 5 wherein the voltage of the electric signal is between two and five volts.

7. The method as set forth in claim 5 wherein the current of the electric signal is between one hundred fifty and three hundred seventy-five amperes.

8. The method as set forth in claim 5 wherein the gears are rotated in mesh at between five hundred and two thousand revolutions per minute.

References Cited

UNITED STATES PATENTS

| | | | |
|---|---|---|---|
| 1,668,840 | 5/1928 | Domizi | 51—26 |
| 1,917,178 | 7/1933 | Wolfe | 51—26 |
| 2,393,113 | 1/1946 | Lucas | 73—162 |
| 2,526,423 | 10/1950 | Rudorff | 219—69 |
| 2,899,535 | 8/1959 | Krall | 219—69 |
| 2,974,215 | 3/1961 | Inoue | 219—69 |

FOREIGN PATENTS 1,224,109  2/1960  France.

RICHARD M. WOOD, *Primary Examiner.*

R. F. STAUBLY, *Assistant Examiner.*